Dec. 22, 1964  D. I. BOHN  3,162,276
SELF-ADJUSTING BRAKE
Filed April 18, 1963
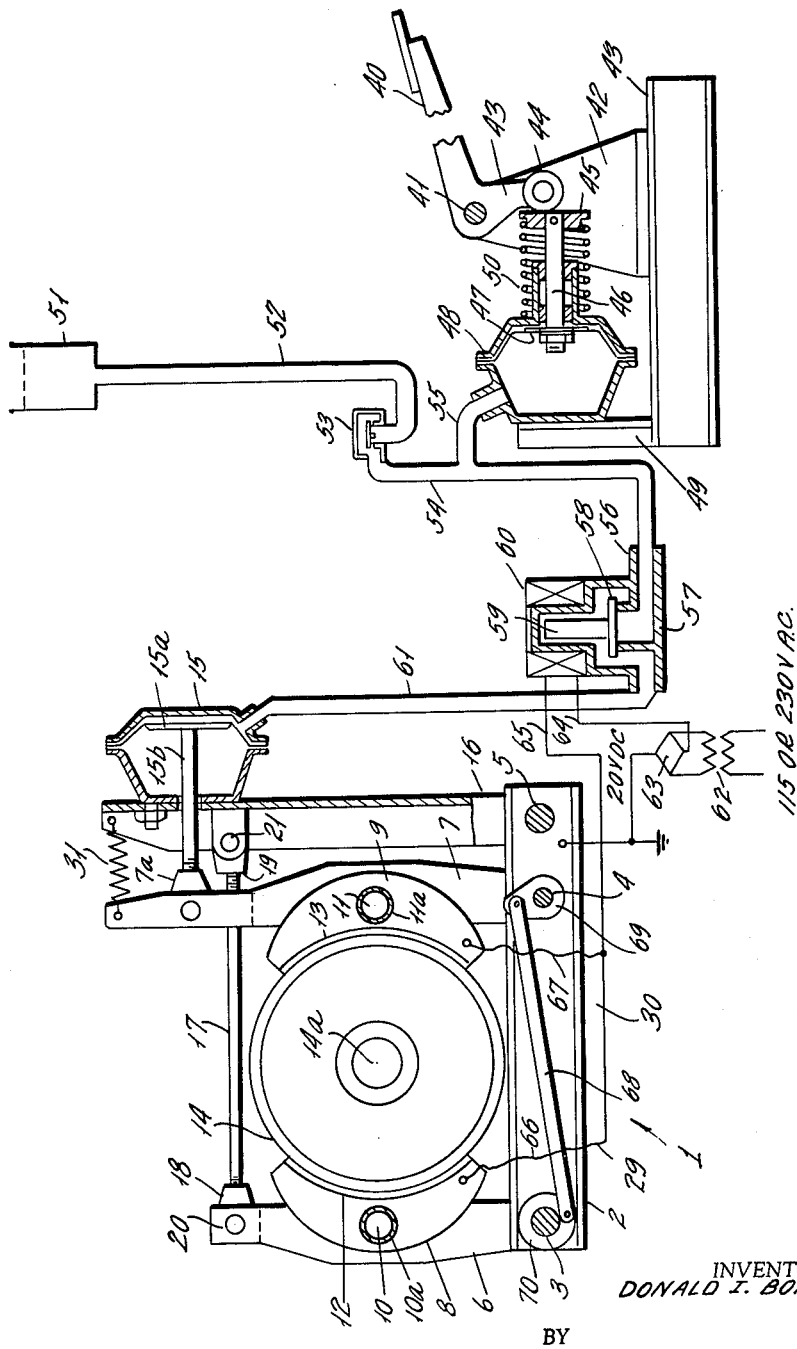
INVENTOR.
DONALD I. BOHN
BY
OSTROLENK, FABER, GERB & SOFFEN
ATTORNEYS 3,162,276
SELF-ADJUSTING BRAKE
Donald I. Bohn, Asheville, N.C., assignor to I-T-E Circuit Breaker Company, Philadelphia, Pa., a corporation of Pennsylvania
Filed Apr. 18, 1963, Ser. No. 273,960
9 Claims. (Cl. 188—152)

This invention relates to a novel hydraulic brake, and more specifically relates to a hydraulic brake which is self-adjusting to have the same opening distance between the brake shoe and drum, regardless of wear on the brake shoe lining.

Hydraulic brakes are well known for many mechanical applications such as use in cranes and other industrial machinery. One disadvantage of such hydraulic brakes is that as the brake lining wears, the brakes must be frequently readjusted.

Moreover, the hydraulic systems used normally have points of leakage such as pistons and packings so that periodic "bleeding" of air is needed.

The principal object of this invention is to provide a novel hydraulic brake which is self-adjusting to automatically compensate for lining wear.

Another object of this invention is to provide a novel hydraulic brake wherein the hydraulic system has no points of leakage so that periodic bleeding of air is not needed.

A further object of this invention is to provide a novel hydraulic brake system wherein the brake shoe and drum form electrical terminals which are connected together when the brake is applied and are disconnected when the brake is released.

These and other objects of this invention will become apparent from the following description when taken in connection with the drawing which shows a side plan view partially in cross-section of the novel self-adjusting hydraulic brake of the invention.

Referring now to the drawing, the brake structure 1 consists of a structural welded base 2 which carries three fulcrum pins 3, 4 and 5 therein. Pins 3 and 4 are secured to brake arms 6 and 7 respectively, which are permitted to rotate by a few degrees when the brake is applied and released.

Arms 6 and 7 carry brake shoes 8 and 9 by means of pins 10 and 11. The brake shoes 8 and 9 are so arranged that they are electrically insulated from their respective brake arms 6 and 7. By way of example, suitable insulation bushings 10a and 11a on pins 10 and 11, along with other suitable washers (not shown) of insulation material can provide an insulated, but pivotal, connection between brake shoes 8 and 9 and their respective operating arms 6 and 7.

The brake shoes 8 and 9 each carry brake linings 12 and 13 respectively, which linings are intended to frictionally engage the surface of the brake drum 14.

In accordance with the invention, the brake linings 12 and 13 are made of a conductive material. By way of example, the brake linings can be suitably formed of asbestos which is interwoven throughout with soft aluminum or copper wire. The brake wheel or drum 14 is of conductive material, whereby tests have shown that when the brake linings 12 and 13 engage drum 14, a relatively low electrical resistance connection is formed between brake shoes 8 and 9 which are normally insulated from one another.

Other suitable brake linings which are sufficiently good electrical conductors are presently commercially available.

The operating mechanism for operating the brake 1 includes a rubber diaphragm-type of pressure unit 15 which is rigidly mounted on channel 16 which is, in turn, pivotally carried from base 2 by pin 5. The pressure unit 15 may, for example, be of the type known by the name "Robotaire Chamber" manufactured by the Bendix-Westinghouse Corporation at Elyria, Ohio.

The chamber 15 includes a diaphragm 15a therein which has a rod 15b and an integral pressure plate extending therefrom which is attached to the upper end of operating arm 7 through the clevis 7a.

The upper end of channel 16 and, thus, pressure unit 15 which is rigidly clamped to the upper end of channel 16 is connected to operating arm 6 through a rod 17 which is captured between clevises 18 and 19 which are carried by pins 20 and 21 respectively in arms 6 and 16 respectively. The upper ends of operating arms 7 and 16 are then connected together by a tension spring 31.

It can now be seen that when the pressure unit 15 has hydraulic pressure applied on the right-hand side of diaphragm 15a, it will force arm 7 in a counterclockwise direction about pivot 4 and will pull the upper end of arm 6 in a clockwise direction about pin 3 to thereby apply brake shoes 8 and 9 to the brake wheel 14. The spring 31 is a return spring which opposes this action.

The hydraulic operating system includes a foot pedal 40 which is pivotally mounted on pivot pin 41 of structural member 42 which extends from support frame 43.

Pedal 40 has an extending arm portion 43 which carries a roller 44 which bears against the extending collar 45 of rod 46. The left hand end of rod 46 is secured to the diaphragm 47 of pressure unit 48 where pressure unit 48 is similar in construction to unit 15 except for the arrangement of their operating rods. Pressure unit is carried from extending member 49 of frame 43. A biasing compression spring 50 is then arranged between collar 45 and the housing of unit 48 to bias collar 45 to the right.

The hydraulic system includes an elevated source of fluid 51 which is connected to conduit 52. The end of conduit 52 is connected through a check valve 53 to a conduit 54. Valve 53 permits fluid to flow from conduit 52 to conduit 54, but will prevent reverse flow. Conduit 54 is connected to the interior of pressure unit 47 by pipe 55 and is further connected to the inlet portion 56 of solenoid valve 57. Solenoid valve 57 has a valve member 58 having a ferromagnetic weight 59 thereon which is contained within solenoid 60. When solenoid 60 is energized, it lifts valve 58 from its blocking position shown to connect inlet portion 56 to conduit 61 leading to the right hand side of diaphragm 15a.

The electrical control circuit for the system includes a conventional A.-C. source connected to rectifier transformer 62 which has a single phase bridge connected rectifier 63 connected thereto. One terminal of rectifier 63 is connected to lead 64 of solenoid 60. The other terminal of rectifier 63 is connected to the grounded frame 2. Lead 65 of solenoid 60 is connected to shoes 8 and 9 by conductors 66 and 67 so that lead 65 will be grounded to drum 14 when conductive linings 12 and 13 engage drum 14. Thus, when shoes 8 and 9 engage drum 14, solenoid 60 will conduct D.-C. current through the circuit formed between drum 14 and the conductive linings 12 and 13.

In operation, the hydraulic system is completely filled with an appropriate fluid. Assume that the drum 14 is rotating with its shaft 14a, and linings 12 and 13 are held spaced from drum 14. Note that link 68 causes equal spacing of shoes 8 and 9 from drum 14. That is, link 68 is connected between arm 69 secured to pivot rod 4 and collar 70 secured to pivot 3. The manner in which this equalization takes place is unimportant to the present invention and is more fully explained in my co-pending application Serial No. 55,381, filed September 12, 1960.

In order to apply the brakes, foot lever 40 is depressed to move diaphragm 47 to the left. This forces the fluid in unit 48 into conduit 54 and into inlet 56 of solenoid valve 57. Note that check valve 53 prevents fluid flow into conduit 52. The fluid entering inlet 56 moves weighted valve 58 upwardly so the fluid enters conduit 61 and moves diaphragm 15a to the left. This moves rod 15b to the left and forces arm 7 counter-clockwise and arm 6 clockwise (by the reaction force on pivoted support 16 and rod 17) to move the brake shoes and linings 12 and 13 into engagement with drum 14. Once this engagement occurs, a circuit is completed between D.-C. source 63 and solenoid 60 so that the solenoid 60 holds valve 58 open.

When it is desired to release the brake, the operator releases pedal 40, and spring 31 begins to open brake shoes 8 and 9. Fluid can then flow out of chamber 15 into conduit 61 and through conduit 61, valve 57, conduit 54 and into the interior of unit 48. This flow of fluid continues so long as valve 57 is open whereby the separation of brake linings 12 and 13 from drum 14 is determined by the length of time valve 58 is open.

It will be noted that solenoid 60 is deenergized as soon as the brake linings 12 and 13 leave drum 14. Therefore, valve 58 will close immediately thereafter or with whatever time delay is desired to have the linings 12 and 13 spaced from drum 14 with the desired clearance. Moreover, and in accordance with the invention, the same brake lining clearance will always be automatically achieved regardless of wear of the linings.

Intentional time delays are achieved by appropriately adjusting the weight of member 59, or through the use of well known shading coils for solenoid 60 as used in A.-C. relays.

Since there are no points of leakage in the system, periodic "bleeding" of air will not be needed. Moreover, reservoir 51 and check valve 53 assure that the system is always full of fluid.

Clearly other check valve arrangements could be used as where the check valve is opened only when the foot lever 40 is depressed. Moreover, the check valve could be replaced by a biased-open valve member, movable to the closed position responsive to operation of the foot pedal.

When it is desired to use this type arrangement for a device such as a D.-C. crane, to avoid grounding the D.-C. system, the brake wheel is mounted on insulating bushings and a brush on the brake wheel is connected to one side of the D.-C. power source. The other D.-C. line is then connected to a terminal of solenoid 60 while the other solenoid terminal is connected to both shoes 12 and 13.

Although I have described preferred embodiments of my novel invention, many variations and modifications will now be apparent to those skilled in the art, and I prefer therefore to be limited not by the specific disclosure herein but only by the appended claims.

The embodiments of the invention in which an exclusive privilege or property is claimed are defined as follows:

1. A self-adjusting hydraulic brake comprising a brake shoe having a lining, a brake drum, hydraulic actuating means connected to said brake shoe, a solenoid valve in said hydraulic actuating means movable between an open and closed condition, and electrical circuit means connected to said solenoid valve, said brake shoe lining and said brake drum, said brake shoe lining being movable between a brake position and release position with respect to said brake drum; said electrical circuit means providing current for said solenoid valve responsive to engagement between said brake shoe lining and said brake drum; said solenoid valve being open when electrical current flows thereto and closed when said electrical current is interrupted; time delay means connected to said solenoid valve to delay the closing of said solenoid valve for a predetermined length of time after electrical current to said solenoid valve is interrupted whereby said brake lining has a constant release spacing from said brake drum.

2. The device substantially as set forth in claim 1 wherein said brake lining is electrically conductive; said brake lining and said drum being connected in said electric circuit to define a conductive path to said solenoid while said brake shoe lining engages said brake drum.

3. The device substantially as set forth in claim 2 wherein said hydraulic actuating means comprises a closed hydraulic system.

4. The device substantially as set forth in claim 3 wherein a fluid reservoir is connected to said hydraulic system through a check valve means.

5. In combination, a brake drum, a brake shoe having a brake lining movable between an engaged and released position with respect to said brake drum, spring biasing means connected to said brake shoe for biasing said brake shoe to said released position, an operating member, a hydraulic actuating system, and a valve; a first portion of said hydraulic actuating system being connected to said operating member; a second portion of said hydraulic system being connected to said brake shoe; said valve being connected in said hydraulic operating system in a position to control fluid communication between said first and second portion of said actuating system; said brake shoe being movable to a released position when said valve is opened and being stopped in movement when said valve is closed; said brake shoe lining surface being operatively connected to said valve and moving said valve toward its closed position when said lining moves toward said released position; said valve being closed and the movement of said brake shoe being stopped when the surface of said lining moves a predetermined distance from said brake drum; said valve being solenoid actuated.

6. The device as set forth in claim 5 wherein said brake shoe lining is electrically conductive.

7. The device as set forth in claim 6 wherein an electric circuit including a voltage source, said brake shoe lining, said brake drum is connected to said solenoid valve whereby said valve is energized and open when said brake shoe lining engages said brake shoe drum.

8. The device as set forth in claim 7 wherein said solenoid valve is closed when said electric circuit is opened by disengagement between said brake shoe lining and said brake drum; and time delay means for delaying the closing of said valve after disengagement between said lining and said drum.

9. The device substantially as set forth in claim 5 wherein said hydraulic system includes a reservoir connected thereto through check valve means.

References Cited in the file of this patent
UNITED STATES PATENTS 2,410,132    Smisko    Oct. 29, 1946
2,911,004    Whitten    Nov. 3, 1959